Sept. 8, 1925.

G. A. CAMPBELL 1,552,467

MEANS AND METHOD FOR MEASURING DIRECT CAPACITIES

Filed July 14, 1923

INVENTOR
G. A. Campbell
BY
ATTORNEY

Patented Sept. 8, 1925.

1,552,467

UNITED STATES PATENT OFFICE.

GEORGE A. CAMPBELL, OF UPPER MONTCLAIR, NEW JERSEY, ASSIGNOR TO AMERICAN TELEPHONE AND TELEGRAPH COMPANY, A CORPORATION OF NEW YORK.

MEANS AND METHOD FOR MEASURING DIRECT CAPACITIES.

Application filed July 14, 1923. Serial No. 651,589.

To all whom it may concern:

Be it known that I, GEORGE A. CAMPBELL, a citizen of the United States, residing at Upper Montclair, in the county of Essex and State of New Jersey, have invented certain Improvements in Means and Methods for Measuring Direct Capacities, of which the following is a specification.

This invention relates to the measurement of capacity and particularly to means and methods for the measurement of direct capacities.

Formerly it was the practice among telephone engineers to make so-called "mutual capacity" measurements between the conductors comprising one or more telephone circuits. Mutual capacity measurements, however, are of little value in connection with cross-talk determinations and consequently, it has been more recently the practice to measure the so-called "direct capacity", thereby permitting accurate control of cross-talk and determining more completely how telephone circuits behave under all possible connections. By the direct capacities of an electrical system, is meant the capacities of a particular direct network which is equivalent to the given electrical system as will be more specifically set forth hereinafter.

Telephone cables and other parts of the telephone plant present the problem of measuring capacities which are quite impossible to isolate but which must be measured just as they occur in association with other capacities; and these associated capacities may be much larger than the particular direct capacity which it is necessary to accurately measure, and have admittances overwhelmingly larger than the direct conductance which is often the most important quantity. This renders it desirable to make direct capacity measurements, as distinguished from ordinary capacity measurements in which isolation of the capacity is secured or at least assumed.

Various methods and arrangements for making direct capacity measurements have been proposed, of which the one in most common use is what is known as the substitution alternating-current bridge method. This method, however, involves two settings of the bridge for each individual direct capacity measurement, as the capacity to be measured must first be connected across one arm of the bridge and the bridge then balanced, after which the capacity is connected across another arm of the bridge and a balance again obtained. The actual capacity is determined by combining the results of the two settings. It is one of the objects of the present invention to provide methods and apparatus whereby the measurement of a given direct capacity may be made by the use of ordinary indicating instruments without necessitating any balancing operation for a bridge, or the like.

The invention may now be more fully understood from the following description when read in connection with the accompanying drawings in which.

Figure 1:
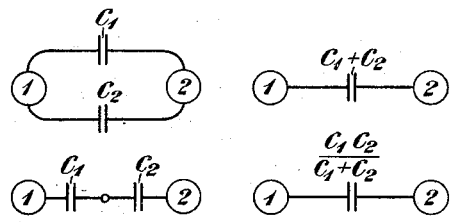
Figure 1 illustrates how simple fundamental capacity systems may be resolved into equivalent direct capacities.

Before proceeding with the description of the invention it is desirable that a few fundamental principles relating to direct capacities be understood. It is a familiar fact that two condensers of capacities $C_1$ and $C_2$, when in parallel or in series, are equivalent to a single capacity $(C_1+C_2)$ or $C_1C_2/(C_1+C_2)$, respectively, directly connecting the two terminals, as indicated in Fig. 1. These equivalent capacities it is proposed to call direct capacities. The rules for determining them may be stated in a form having general applicability, as follows:

*Rule 1.*—The direct capacity which is equivalent to capacities in parallel is equal to their sum.

*Rule 2.*—The direct capacity between two terminals, which is equivalent to two capacities connecting these terminals to a concealed branch-point, is equal to the product of the two capacities divided by the total capacity terminating at the concealed branch-point, i. e., its grounded capacity.

These rules may be used to determine the direct capacities of any network of condensers, with any number of accessible terminals and any number of concealed branch-points. Thus, all concealed branch-points may be initially considered to be accessible, and they are then eliminated one after another by applying these two rules; the final result is independent of the order in which the points are taken; a network of capacities, directly connecting the accessible terminals, without concealed branch-points or capacities in parallel, is the final result.

Figure 2:
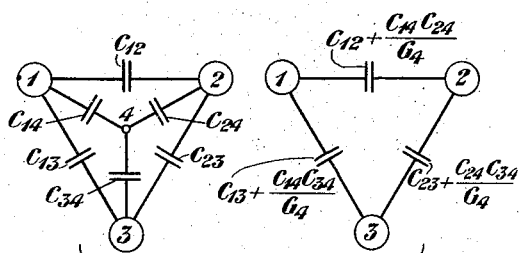
Fig. 2 illustrates how a more complicated network of capacities may be resolved into a simpler equivalent direct capacity network.

Fig. 2 is an illustration of a more complicated system of capacities involving three conductors or terminals 1, 2 and 3, assumed to be accessible and a fourth terminal inaccessible or concealed. By applying the rules above given it is seen at once that the direct capacity between the terminals 1 and 2 of the equivalent net work shown at the right of Fig. 2 and which is equivalent to the more complicated network of capacities shown at the left has a value $C_{12}+C_{14}C_{24}/G_{24}$ where $G_{24}$, the ground capacity of the terminal 4 equals $C_{14}+C_{24}+C_{34}$.

Generalizing, we have the following definition:

The direct capacities of an electrical system with $n$ given accessible terminals are defined as the $n(n-1)/2$ capacities which, connected between each pair of terminals, will be the exact equivalent of the system in its external reaction upon any other electrical system with which it is associated only by conductive connections through the accessible terminals.

This definition of direct capacity presents a complete set of direct capacities as constituting an exact symmetrical realizable physical substitute for the given electrical system for all purposes. The following statements of the additive property of direct capacities shown the simple manner in which direct capacities are altered under some of the most important external operations which can be made with an electrical network.

Connecting a capacity between two terminals adds that capacity to the direct capacity between these terminals, and leaves all other direct capacities unchanged. Connecting the terminals of two distinct electrical systems, in pairs, gives a system in which each direct capacity is the sum of the corresponding two direct capacities in the individual systems. Joining two terminals of a single electrical system to form a single terminal adds together the two direct capacities from the two merged terminals to any third terminal, and leaves all other direct capacities unchanged, with the exception of the direct capacity between the two merged terminals, which becomes a short circuit. Combining the terminals into any number of merged groups leaves the total direct capacity between any pair of groups unchanged, and short-circuits all direct capacities within each group.

With this understanding of the properties of direct capacities in mind, the present invention will now be explained in detail.

Figure 3:
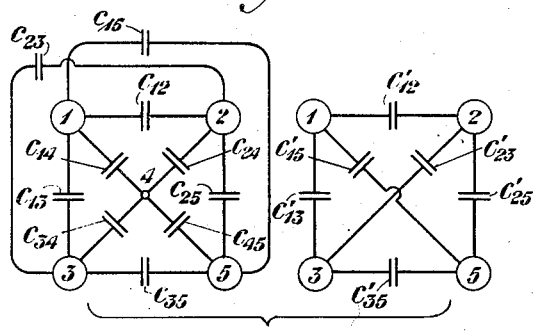
Figs. 3 and 4 illustrate how a system of four conductors with capacities between each other and capacities to ground may be reduced to direct capacity network of the type illustrated in Fig. 2, for the purpose of making a given measurement.

Let us assume that we have a group of four conductors, 1, 2, 3 and 5, as shown in Fig. 3, and that we desire to measure the direct capacity between the conductors 1 and 2. Taking each of the conductors in pairs a capacity will exist between the conductors of each pair and a capacity will also exist between each individual conductor and ground, represented by terminal 4, as indicated at the left of Fig. 3. This network may be simplified by eliminating the ground terminal 4 and obtaining the equivalent network of direct capacities shown at the right of Fig. 3. The values of the direct capacities shown at the right of Fig. 3 in terms of the individual capacities of the network at the left of Fig. 3 may be obtained from the principles already given in a manner similar to that discussed in connection with Fig. 2.

Figure 4:
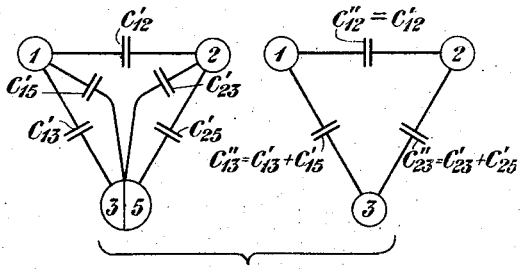

In order to reduce the equivalent system of direct capacities shown in Fig. 3 into the simpler form shown in Fig. 2, the conductors 3 and 5 may be joined together. This results in short-circuiting the capacity $C'_{35}$ so that it is eliminated, as shown at the left in Fig. 4. The capacities joining the combined terminal 3—5 with terminal 1 may be combined and similarly the capacities joining the combined terminal 3—5 with terminal 2 may be combined so that we obtain the simple network of equivalent direct capacity shown at the right of Fig. 4. It will be observed that in this transformation the direct capacity $C'_{12}$ has not been changed, although for purposes of uniformity it is designated as $C''_{12}$. By following a procedure similar to that just outlined any system of conductors in capacitative relation, of which the direct capacity between two of the conductors is to be measured, may be reduced to a simple network involving only three terminals, with the direct capacity which is to be measured between two of the terminals unchanged.

Figure 5:
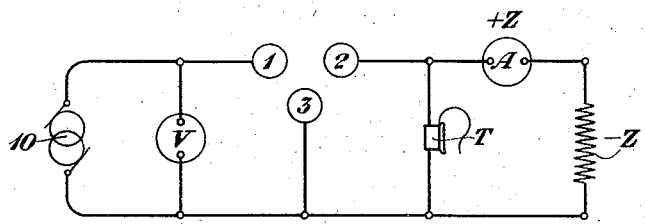
Fig. 5 illustrates a circuit diagram embodying the principles of the present invention.

Fig. 5 shows the circuit for measuring the direct capacity. A source of alternating current 10 is provided and a voltmeter V is bridged across the terminals of the source. Assuming that the direct capacity between terminals 1 and 2 of the system of conductors 1, 2 and 3 is to be measured, the terminal 1 may be connected to one terminal of the source and the terminal 3 to the other terminal of the source. The third terminal 2 is connected to the source through an ammeter A. Assuming that the ammeter has an impedance plus Z, it is necessary to introduce a negative impedance minus Z in series with the ammeter, so that the potential drop from terminal 2 to the lower terminal of the source 10 will be zero. In order to determine whether or not the negative impedance Z is adjusted to equalize the impedance plus Z of the ammeter, a telephone receiver T may be bridged across the circuit, as indicated. As will be obvious from the diagram, a proper adjustment of the negative impedance Z will give silence in the telephone receiver.

Figure 6:
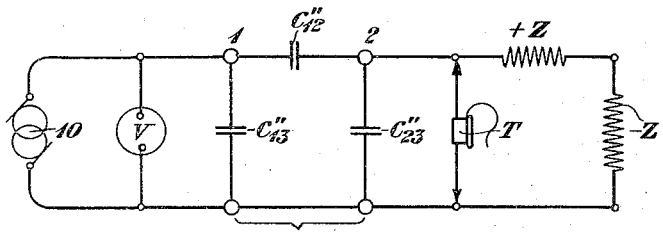
Fig. 6 shows the capacity distribution of the circuit arrangement of Fig. 5.

The distribution of the three direct capacities involved in this measurement will be apparent from the diagram of Fig. 6. As will be seen, the direct capacity $C''_{12}$ is connected between terminals 1 and 2. The direct capacity $C''_{13}$ is bridged across the terminals of the source and consequently produces no effect whatever upon the current flowing through the circuit including the direct capacity $C''_{12}$. The third direct capacity $C''_{23}$ is connected between terminals 2 and 3, which will be at the same potential if the negative impedance minus Z equalizes the impedance plus Z of the ammeter. No current, therefore, flows through the capacity $C''_{23}$ and the current flowing through the ammeter A will be equal to the current flowing through the direct capacity $C''_{12}$, which is to be measured.

Under these conditions the value of the direct capacity $C''_{12}$ may be obtained directly from the well known formula $$C_{12} = \frac{I}{2\pi f E}$$

in which I is the current measured by the ammeter, E is the voltage measured by the voltmeter and $f$ is the frequency of the source.

Figure 7:
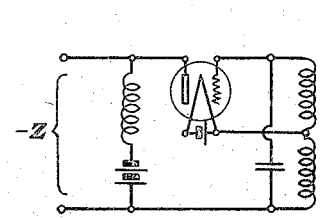
Fig. 7 shows a simple form of vacuum tube circuit whereby the negative resistance to be used in connection with the circuit of Fig. 5 may be obtained.

The negative resistance for the circuit may be obtained by the use of a vacuum tube circuit, as shown in Fig. 7. As is well known, a vacuum tube arranged with a feedback connection, may be adjusted to have any definite negative resistance across its output terminals at a given frequency. The alternating frequency supplied to the measuring circuit by the source 10 may easily be maintained constant and by adjusting the characteristic of the vacuum tube of Fig. 7, so that the telephone T is silent in Fig. 5, the direct capacities may be determined from the readings of the indicating instruments without the necessity of any nice adjustments for balance.

It will be obvious that the general principles herein disclosed may be embodied in other organizations widely different from those illustrated without departing from the spirit of the invention as defined in the appended claims.

What is claimed is:

1. The method of measuring the direct capacity between two conductors of a system of conductors in capacitative relation, which consists in joining together all of the conductors except the two between which the direct capacity is to be measured, thereby reducing the capacities between the various conductors to a simple direct network involving three equivalent direct capacities without changing the direct capacity between the two conductors to be measured, connecting the direct capacity to be measured serially in circuit with a source of alternating current and a current measuring instrument, connecting the junction of the other two direct capacities to the other terminal of said source so that one of said capacities is, in effect, bridged across the source without affecting the current that flows through the measuring instrument, and producing the same potential at the terminals of the third direct capacity so that it is, in effect, short-circuited, whereby the current flowing through the indicating instrument is a direct measure of the direct capacity to be measured.

2. The method of measuring the direct capacity between two conductors of a system of conductors in capacitative relation, which consists in joining together all of the conductors except the two between which the direct capacity is to be measured, thereby reducing the capacities between the various conductors to a simple direct network involving three equivalent direct capacities without changing the direct capacity between the two conductors to be measured, connecting the direct capacity to be measured serially in circuit with a source of alternating current and a current measuring instrument, connecting the junction of the other two direct capacities to the other terminal of said source so that one of said capacities is, in effect, bridged across the source without affecting the current that flows through the measuring instrument, and opposing the impedance of the measuring instrument with a negative impedance of equal value so that there is no drop in potential through the indicating instrument and the third direct capacity is, in effect, short-circuited.

3. A circuit for measuring direct capacities comprising a source of potential, a group of conductors in capacitative relation, two of said conductors constituting the terminals of a direct capacity which is to be measured, one of said pair of conductors being connected to one terminal of said source of potential, the other conductor of said pair being connected to the other terminal of said source through a current indicating instrument and the remaining conductors of the group being joined directly to the opposite terminal of said source, and means to produce equal potentials at said opposite terminal of said source and at the junction point between the second of said pair of conductors and said indicating instrument.

4. A circuit for measuring direct capacities comprising a source of potential, a group of conductors in capacitative relation, two of said conductors constituting the terminals of a direct capacity which is to be measured, one of said pair of conductors being connected to one terminal of said source of potential, the other conductors of said pair being connected to the other terminal of said source through a current indicating instrument and the remaining conductors of the group being joined directly to the opposite terminal of said source and a negative impedance included in series with said indicating instrument and having a value equal to the impedance of said indicating instrument so that there will be no effective drop in potential through the part of the circuit including said indicating instrument.

5. A system for measuring direct capacities comprising a source of potential, a plurality of conductors including two conductors the direct capacity between which is to be measured, the remainder of the conductors being joined together to form, in effect, the third terminal of a system of three direct capacities, one of said pair of conductors comprising a terminal of the direct capacity to be measured and being connected to one terminal of said source, the other of said pair of conductors comprising a terminal of the direct capacity to be measured and being connected to the other terminal of said source through an indicating instrument, the effective third terminal of said system of direct capacities being connected directly to the opposite terminal of said source so that one of the direct capacities which is not to be measured is, in effect, bridged across the terminals of the source without affecting the current flowing through the direct capacity which is to be measured, and means to produce equal potentials at the second of said pair of conductors and the effective third terminal of the system, whereby the remaining direct capacity which is not to be measured is, in effect, short-circuited and the current flowing through the indicating instrument is equal to the current flowing through the direct capacity to be measured.

6. A system for measuring direct capacities comprising a source of potential, a plurality of conductors including two conductors the direct capacity between which is to be measured, the remainder of the conductors being joined together to form, in effect, the third terminal of a system of three direct capacities, one of said pair of conductors comprising a terminal of the direct capacity to be measured and being connected to one terminal of said source, the other of said pair of conductors comprising a terminal of the direct capacity to be measured and being connected to the other terminal of said source through an indicating instrument, the effective third terminal of said system of direct capacities being connected directly to the opposite terminal of said source so that one of the direct capacities which is not to be measured is, in effect, bridged across the terminals of the source without affecting the current flowing through the direct capacity which is to be measured, and a negative impedance included in circuit with said indicating instrument and having a value equal to but opposite in sign to the impedance of the indicating instrument so that there is no drop of potential through the indicating instrument and the other direct capacity which is not to be measured is, in effect, short-circuited.

In testimony whereof, I have signed my name to this specification this 13th day of July, 1923.

GEORGE A. CAMPBELL.